United States Patent
Chang et al.

(10) Patent No.: US 7,068,733 B2
(45) Date of Patent: Jun. 27, 2006

(54) SAMPLING TECHNIQUE FOR DIGITAL BEAM FORMER

(75) Inventors: Donald C. D. Chang, Thousand Oaks, CA (US); Kar W. Yung, Torrance, CA (US); Urban A. Von der Embse, Westchester, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 782 days.

(21) Appl. No.: 09/973,270

(22) Filed: Oct. 5, 2001

(65) Prior Publication Data

US 2002/0106041 A1   Aug. 8, 2002

Related U.S. Application Data

(60) Provisional application No. 60/266,813, filed on Feb. 5, 2001.

(51) Int. Cl.
*H04L 9/00* (2006.01)
*H04B 7/185* (2006.01)
*H01Q 3/26* (2006.01)
*H04N 11/02* (2006.01)

(52) U.S. Cl. ............. 375/316; 375/240; 375/240.21; 455/12.1; 342/371

(58) Field of Classification Search ........... 455/12.1; 370/281; 332/103; 342/371, 383
See application file for complete search history.

(56) References Cited

U.S. PATENT DOCUMENTS

| | | | |
|---|---|---|---|
| 2,470,787 A | 5/1949 | Nosker | 342/12 |
| 3,384,891 A | 5/1968 | Anderson | 343/6.5 |
| 3,541,553 A | 11/1970 | Gubin | |
| 3,544,995 A | 12/1970 | Bottenberg et al. | 342/46 |
| 3,673,606 A | 6/1972 | Maune | |
| 3,720,953 A | 3/1973 | Ajioka | 343/771 |
| 4,161,730 A | 7/1979 | Anderson | |
| 4,161,734 A | 7/1979 | Anderson | 343/100 |
| 4,359,733 A | 11/1982 | O'Neill | 343/6.5 |
| 4,613,864 A | 9/1986 | Hofgen | 343/357 |
| 4,635,063 A | 1/1987 | Chang et al. | 342/380 |
| 4,819,227 A | 4/1989 | Rosen | 370/75 |
| 4,897,661 A | 1/1990 | Hiraiwa | 342/457 |
| 4,926,186 A | 5/1990 | Kelly | |

(Continued)

FOREIGN PATENT DOCUMENTS

EP   0190927   8/1986

(Continued)

OTHER PUBLICATIONS

Kobayashi et al, "Aperture Jitter Effects in Wideband ADC Systems", IEEE Proceedings of ICECS'99 Electronics, Circuits and Systems, Sep. 5-8, 1999, vol. 3 pp. 1705-1708.*

(Continued)

*Primary Examiner*—Stephen Chin
*Assistant Examiner*—Linda Wong
(74) *Attorney, Agent, or Firm*—Georgann S. Grunebach

(57) ABSTRACT

A mobile satellite payload 18 and a method for sampling communication signals 26 are provided. The mobile satellite payload 18 uses a plurality of receive radiating elements 24 within a phase array antenna 22 to convert the communication signals 26 to received signals [S(t)]. A plurality of low noise amplifiers (LNAs) 28 amplify the received signals [S(t)] to then be received by a plurality of analog-to-digital (A/D) converters 29. The A/D converters 29 transform the received signals [S(t)] into digital baseband signals [S"(t)].

15 Claims, 3 Drawing Sheets

U.S. PATENT DOCUMENTS

| | | | |
|---|---|---|---|
| 4,979,170 A | 12/1990 | Gilhousen et al. | 370/104.1 |
| 4,994,809 A | 2/1991 | Yung et al. | 342/108 |
| 5,006,855 A | 4/1991 | Braff | 342/357 |
| 5,017,927 A | 5/1991 | Agrawal et al. | 342/371 |
| 5,077,562 A | 12/1991 | Chang et al. | 342/368 |
| 5,099,245 A | 3/1992 | Sagey | 342/357 |
| 5,111,209 A | 5/1992 | Toriyama | 342/357 |
| 5,126,748 A | 6/1992 | Ames et al. | 342/353 |
| 5,151,706 A | 9/1992 | Roederer et al. | |
| 5,218,619 A | 6/1993 | Dent | 375/1 |
| 5,233,626 A | 8/1993 | Ames | 375/1 |
| 5,278,863 A | 1/1994 | Briskman | 375/1 |
| 5,319,673 A | 6/1994 | Briskman | 375/1 |
| 5,387,916 A | 2/1995 | Cohn | 342/44 |
| 5,410,314 A | 4/1995 | Frush et al. | 342/26 |
| 5,444,450 A | 8/1995 | Olds et al. | 342/357 |
| 5,485,485 A | 1/1996 | Briskman et al. | 375/200 |
| 5,523,726 A * | 6/1996 | Kroeger et al. | 332/103 |
| 5,525,995 A | 6/1996 | Benner | 342/90 |
| 5,550,809 A | 8/1996 | Bottomley et al. | 370/18 |
| 5,555,257 A | 9/1996 | Dent | 370/95.1 |
| 5,572,216 A | 11/1996 | Weinberg et al. | 342/357 |
| 5,589,834 A | 12/1996 | Weinberg | |
| 5,592,471 A | 1/1997 | Briskman | 455/52.3 |
| 5,594,941 A | 1/1997 | Dent | 455/13.4 |
| 5,612,701 A | 3/1997 | Diekelman | 342/354 |
| 5,644,572 A | 7/1997 | Olds et al. | 370/324 |
| 5,739,785 A | 4/1998 | Allison et al. | 342/357 |
| 5,764,187 A | 6/1998 | Rudish et al. | |
| 5,790,070 A | 8/1998 | Natarajan et al. | 342/354 |
| 5,810,284 A | 9/1998 | Hibbs et al. | 244/13 |
| 5,839,053 A | 11/1998 | Bosch et al. | |
| 5,848,060 A * | 12/1998 | Dent | 370/281 |
| 5,856,804 A * | 1/1999 | Turcotte et al. | 342/371 |
| 5,864,579 A | 1/1999 | Briskman | 375/200 |
| 5,903,549 A | 5/1999 | von der Embse et al. | 370/310 |
| 5,909,460 A | 6/1999 | Dent | 375/200 |
| 5,917,447 A * | 6/1999 | Wang et al. | 342/383 |
| 5,920,284 A | 7/1999 | Victor | 342/357.01 |
| 5,944,770 A | 8/1999 | Enge et al. | 701/707 |
| 5,945,948 A | 8/1999 | Buford et al. | 342/457 |
| 5,949,766 A | 9/1999 | Ibanez-Meier et al. | 370/316 |
| 5,969,674 A | 10/1999 | von der Embse et al. | 342/357.17 |
| 5,973,647 A | 10/1999 | Barrett et al. | 343/713 |
| 5,982,337 A | 11/1999 | Newman et al. | |
| 6,016,124 A | 1/2000 | Lo et al. | |
| 6,018,316 A | 1/2000 | Rudish et al. | |
| 6,020,845 A | 2/2000 | Weinberg et al. | |
| 6,061,562 A | 5/2000 | Martin et al. | |
| 6,111,542 A | 8/2000 | Day et al. | 342/359 |
| 6,138,012 A | 10/2000 | Krutz et al. | 455/427 |
| 6,147,658 A | 11/2000 | Higashi et al. | 343/853 |
| 6,151,308 A | 11/2000 | Ibanez-Meier et al. | 370/316 |
| 6,157,811 A * | 12/2000 | Dent | 455/12.1 |
| 6,173,178 B1 | 1/2001 | Hammill et al. | |
| 6,266,528 B1 | 7/2001 | Farzaneh | |
| 6,380,893 B1 | 4/2002 | Chang et al. | |
| 6,388,615 B1 | 5/2002 | Chang et al. | |
| 6,400,925 B1 | 6/2002 | Tirabassi et al. | |
| 2001/0048389 A1 | 12/2001 | Nakagawa | |
| 2002/0006795 A1 | 1/2002 | Norin et al. | |

FOREIGN PATENT DOCUMENTS

| | | |
|---|---|---|
| EP | 0335 558 | 4/1989 |
| EP | 0647976 | 4/1995 |
| EP | 0 860 952 A2 | 8/1998 |
| EP | 0860952 A2 * | 8/1998 |
| EP | 0 961 416 A1 | 12/1999 |
| EP | 1 161 001 A2 | 12/2001 |
| EP | 1161001 A2 * | 12/2001 |
| GB | 2271 902 A | 10/1993 |
| GB | 2306 827 A | 5/1997 |
| GB | 2 349 045 A | 10/2000 |
| JP | 2-28580 | 1/1990 |
| JP | 3-291584 | 12/1991 |
| JP | 4-27887 | 1/1992 |
| JP | 07146995 A | 6/1995 |
| JP | 08015405 A | 1/1996 |
| JP | 09026328 | 1/1997 |
| JP | 09113600 A | 5/1997 |
| JP | 10090391 A | 4/1998 |
| JP | 2001345747 A | 12/2001 |
| WO | WO 97/07609 | 2/1997 |
| WO | WO 97/33342 | 9/1997 |
| WO | WO 99/23769 | 5/1999 |

OTHER PUBLICATIONS

Juodawlkis et al, "Optically Sampled Analog-to-Digital Converters", IEEE Transactions on Microwave Theory and Techniques, vol. 49, No. 10, Oct. 2001.*

Teles J. et al., "Overview of TDRSS" Orbit Determination and Analysis, PSD Meeting, Cospar Technical Panel on Satellite Dynamics, 13th Cospar Scientific Assembly, Hamburg, Germany, Jul. 11-21, 1994, Advances in Space Research, pp. 67-76.

Bricker, P. et. al, "Integrated Receiver for NASA Tracking and Data Relay Satellite System", MILCOM 90, A New Era, 1990 IEEE Military Communications Conference, Monterey, CA USA Sep. 30-Oct. 3, 1990, pp. 1-5.

Dunham, J. B. et. al, "Onboard Orbit Estimation with Tracking and Data Relay Satellite System Data", Journal of Guidance, Control and Dynamics, Jul.-Aug. 1983, USA, col. 6 NR.4, pp. 292-301.

Bethke,K.H., A Novel Noncooperative Near-Range Radar Network For Traffic Guidance and Control on Airport Surfaces, IEEE Transactions on Control Systems Technology, vol. 1, No. 3, Sep. 1993.

Doc 9524 FANS/4-WP/76, International Civil Aviation Organization, Special Committee on Future Air Navigation Systems, Fourth Meeting, Montreal, May 2-20, 1988, Report, pp. 3.2B-2 & 3.2B-3.

Suzuki, R. et. al, Mobile TDM/TDMA System With Active Array Antenna, Global Telecommunications Conference, 1991; Globecom '91, vol. 3, Dec. 2-5, 1991, pp. 1569-1573.

Chan, K.K., et. al, "A Circularly Polarized Waveguide Array for Leo Satellite Communications", Antennas and Propagation Society, 1999, IEEE International Symposium, vol. 1, Jul. 11-16, 1999, pp.154-157.

Oodo, M., et. al, "Onboard DBF Antenna for Stratospheric Platform", 2000 IEEE International Conference on Phased Array Systems and Technology, Proceedings, May 21-25, 2000, pp. 125-128.

Yokosuka Research Park, "The First Stratospheric Platform Systems Workshop", May 12-13, 1999, pp. 1-216.

Chiba, Isamu et. al, "Digital Beam Forming (DBF) Antenna System for Mobile Communications", IEEE AES Systems Magazine, Sep. 1997, pp. 31-41.

Miura, Ryu et. al, "A DBF Self-Beam Steering Array Antenna for Mobile Satellite Applications Using Beam-Space Maximal-Ratio Combination", IEEE Trans. On Vehicular Technology, vol. 48, No. 3, May 1999, pp.665-675.

Sato, Kazuo et al., "Development And Field Experiments of Phased Array Antenna For Land Vehicle Satellite Communications", IEEE Antennas and Propagation Society International Symposium, 1992, Jul. 1992, pp. 1073-1076.

Sakakibara, Kunio et. al, "A Two-Beam Slotted Leaky

Waveguide Array for Mobile Reception of Dual-Polarization DBS", IEEE Transactions on Vehicular Technology, vol. 48, No. 1, Jan. 1999, pp. 1-7.

Miura, Ryu et al., "Beamforming Experiment with a DBF Multibeam Antenna in a Mobile Satellite Environment", IEEE, Apr. 1997, vol. 45, No. 4, XP 000686406.

* cited by examiner

SAMPLING TECHNIQUE FOR DIGITAL BEAM FORMER

RELATED APPLICATION

The present application claims priority to provisional application Ser. No. 60/266,813 filed on Feb. 5, 2001, the entire contents of which are incorporated herein by this reference.

TECHNICAL FIELD

The present invention relates generally to multiple beam communication systems and more particularly, to a method and apparatus for sampling a received signal that is manipulated by a digital beam former.

BACKGROUND OF THE INVENTION

Current commercial mobile satellite communication systems having conventional multiple beam architectures, which use multi-beam phased array antennas, incorporate digital beam forming (DBF) techniques. DBF phased array antennas are very useful in forming multiple simultaneous beams covering a large field of view (FOV).

Typical mobile satellite payloads have a DBF phase array antenna. The phase array antenna includes a plurality of receive array elements for receiving communication signals. Each receive array element is connected to several components for signal-conditioning the communication signals prior to connecting to a digital beam forming network. The receive array elements are connected to a plurality of low noise amplifiers (LNAs), by which the received signal is amplified. The LNAs are connected to a plurality of downconverters. The downconverters convert a high frequency received signal to an analog baseband or intermediate frequency (IF) signal. The analog baseband signal is then transformed into a digital signal by an analog-to-digital (A/D) converter.

Additionally to properly select a sideband in frequency downconversion, satellite payloads usually include a plurality of filters, between the plurality of downconverters and the plurality of A/D converters. The filter helps to eliminate undesired signals and noise in frequency ranges outside of a desired frequency band. The undesired signals may cause aliasing, which can cause interference with the desired signal.

Currently the downconverters are used to convert mobile signals at frequency bands below C-band, down to baseband. In the future, as technology progresses, different downconverters and possibly corresponding filters will be needed to convert signals for other applications in higher frequency bands such as the super high frequency band (SHF), KU band, and extremely high frequency (EHF) band. Unfortunately, increasing satellite communication system versatility, ability to downconvert, and filter higher frequency bands with larger bandwidths increases electronic component count, and system complexity, therefore, increasing cost.

In satellite communication systems there is a continuing effort to decrease the amount of components in the system thereby decreasing the size and weight of the system, decreasing hardware, decreasing costs, decreasing power consumption, and increasing efficiency.

In space systems, where up to thousands of receiving array elements may be used, a reduction in satellite payload components may cause tremendous savings. In other terrestrial communication systems, in which many receive array elements are used the savings in cost, weight, and power will also be increased.

Therefore a need exists to reduce the number of components in the mobile satellite payload. Also a need exists to produce a satellite payload for other applications that is capable of converting signals to digital format at carrier frequency.

SUMMARY OF THE INVENTION

The forgoing and other advantages are provided by a method and apparatus of sampling a communication signal within a mobile satellite payload. The satellite payload uses a plurality of receive radiating elements within a DBF phase array antenna to convert the communication signals to received signals. The received signals are amplified, by a plurality of low noise amplifiers (LNAs), to a desired level for a plurality of analog-to-digital (A/D) converters. The A/D converters transform the received signals into digital baseband signals.

The present invention has several advantages over existing sampling techniques. One advantage of the present invention is that it eliminates the use of separate downconverters and reduces the number of filters in satellite payloads.

Another advantage of the present invention is that it utilizes the "aliasing" characteristics of the A/D converter capability to downconvert L-Band and S-Band frequencies to baseband.

Therefore, a mobile satellite payload having a minimal number of components, which can convert analog signals in frequency bands up to C-band to digital signals, is possible due to the stated method advantages. The present invention itself, together with further objects and attendant advantages, will be best understood by reference to the following detailed description, taken in conjunction with the accompanying drawing.

DETAILED DESCRIPTION OF THE PREFERRED EMBODIMENT

The present invention may be applied in various applications such as a fixed satellite service communication system, general packet radio service (GPRS), universal mobile telecommunication system (UMTS), or other terrestrial mobile communication applications. The present invention may also be incorporated into communication systems using various payload designs such as a low profile array, a surface mount antenna (SMA), or a digital design.

While the present invention is described with respect to a sampling method for a multiple beam mobile satellite communication system, the following sampling method is capable of being adapted for various purposes and is not limited to the following applications: a ground based basestation, mobile terminal, or any other electronic or communication devices.

In the following description, all signals have a frequency domain and a time domain representation. The present invention may operate in various frequency ranges below C-band. As technology improves the present invention may be applied in frequency ranges above C-band. Also in the following description, various operating parameters and components are described for one constructed embodiment. These specific parameters and components are included as examples and are not meant to be limiting.

Figures 1, 2A:
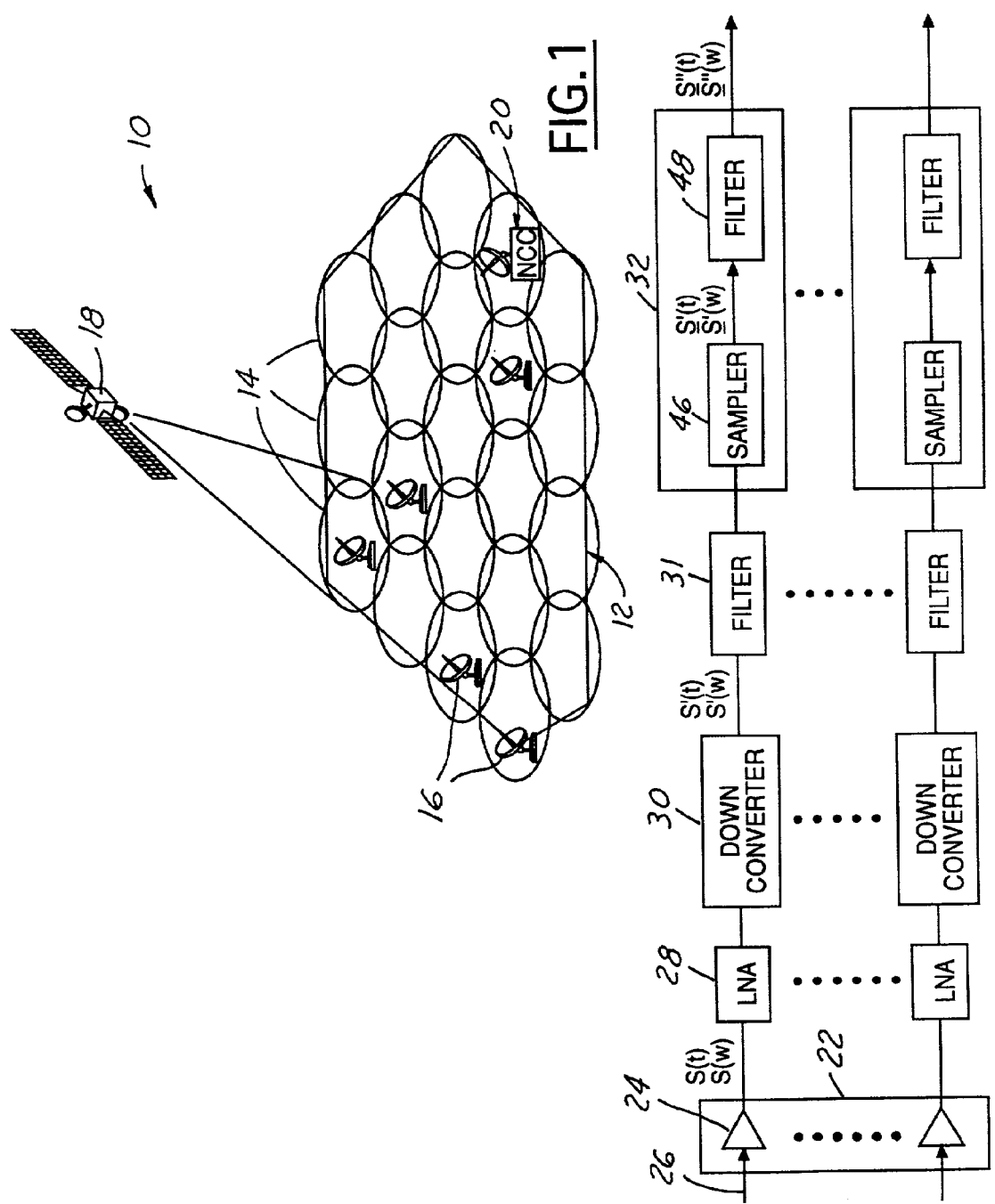
FIG. 1 is a perspective view of a mobile satellite communication system, utilizing a method and apparatus for sampling communication signals according to the present invention.
FIG. 2A is a block diagrammatic view of a conventional DBF mobile satellite payload.

Referring now to FIG. 1, a multiple beam satellite communication system 10 is shown including a total service geographic area 12 covered by a relatively large number of uplink and downlink spot beams having individual footprints 14. High gain uplink and downlink beams are preferably utilized to support mobile terminals 16, with high-data-rate transmission. More importantly, the combination of uplink and downlink beams provides for multiple reuse of the same limited frequency spectrum by a mobile satellite payload 18, thus creating a high-capacity mobile satellite communication system 10 which can serve mass markets for numerous communication services. A network control center (NCC) 20 provides overall transmission control and uplink/downlink frequency assignment for the mobile terminals 16 and the satellite payloads 18.

Figure 2:
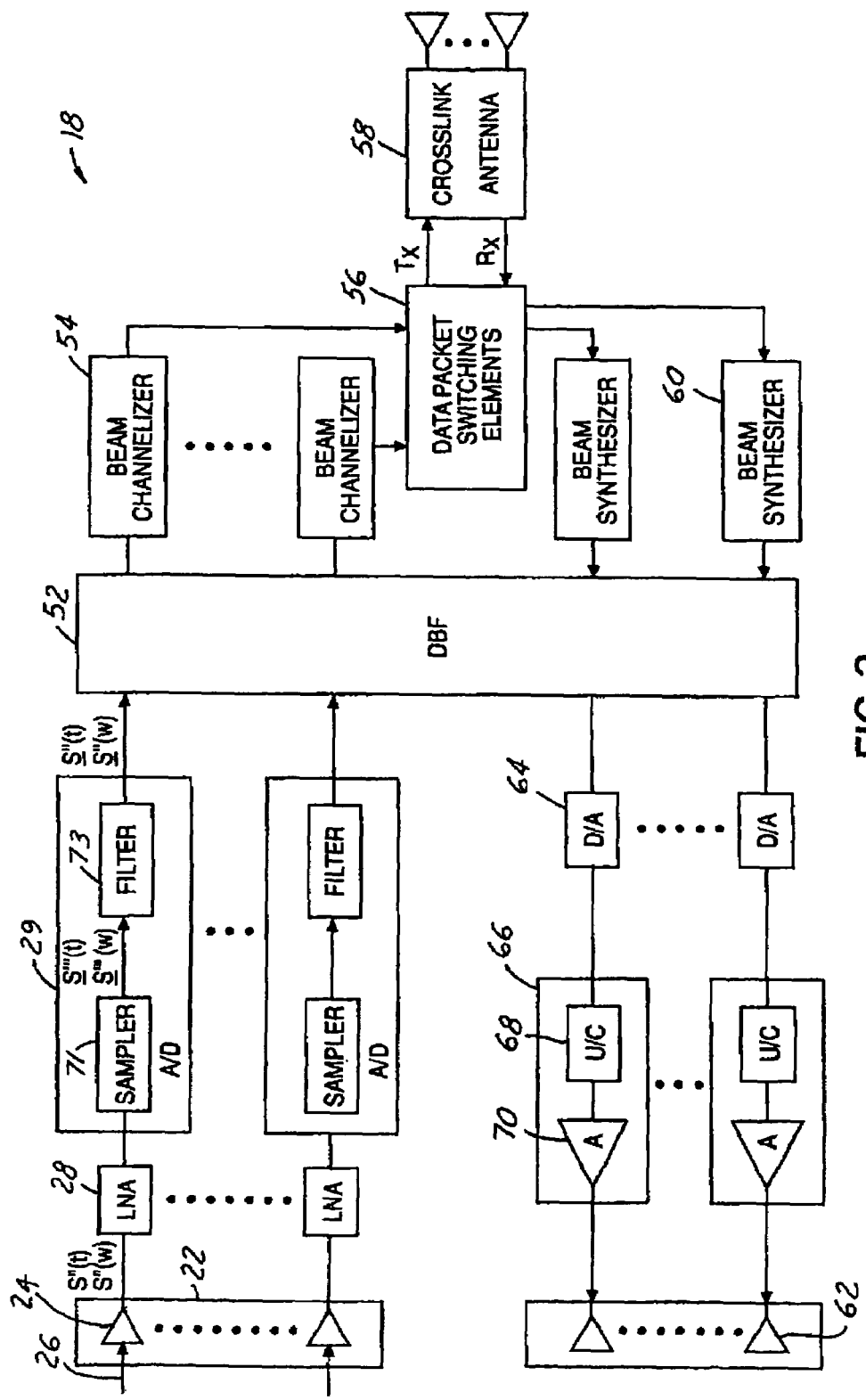
FIG. 2 is a block diagrammatic view of a mobile satellite payload in accordance with the present invention.

Referring now to FIG. 2, a mobile satellite payload 18 utilizing one embodiment of the present invention. The mobile satellite payload 18 includes a digital beam forming (DBF) phase array antenna 22. The DBF phase array antenna 22 has a plurality of receive radiating elements 24 for collecting communication signals 26. The communication signals 26 are signal conditioned using a plurality of low noise amplifiers (LNAs) 28 and a plurality of analog-to-digital (A/D) converters 29.

Referring now to FIG. 2A, a typical mobile satellite payload systems including a plurality of downconverters 30 and a plurality of filters 31 between the LNAs 28 and typical A/D converters 32 is shown.

The receive radiating elements 24 receive communication signals 26, which are detected at the element level to create received signals [S(t)], from a user at a given direction. The received signals [S(t)] have generally equal amplitudes, but different phases at each receive radiating element 24. Each received signal [S(t)] may be decomposed to two components: the carrier signal and the information signal, which modulates the carrier. A typical satellite communication signal may have a carrier signal frequency ($f_c$) equal to approximately 2 GHz. The corresponding information signal frequency may have a bandwidth at approximately 10–20 KHz or less.

Figure 3:
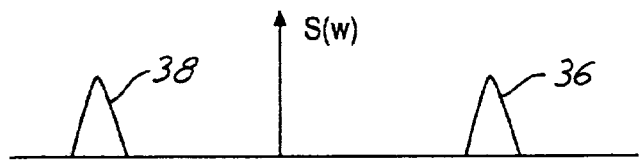
FIG. 3 is a plot of a conventionally received communication signal, in the frequency domain.

Now referring also to FIG. 3, an amplitude vs. frequency plot of a received signal [S(ω)] is shown. S(ω) is the Fourier spectrum of S(t). Each received signal spectrum S(ω) has a positive component 36 and a negative component 38 in the frequency domain. The negative component 38 is identical to the positive component 36 in amplitude but with an opposite phase, if the signal in time domain is real. The plurality of receive radiating elements 24 may consist of any number of elements, as known in the art. Each element in the plurality of receive radiating elements 24 is connected to a LNA 28. The LNA 28 amplifies S(ω) to a desired level for the A/D converter 29. The LNA 28 is conventionally connected to a separate downconverter 30, followed by a filter 31, prior to A/D converter 29 as shown in FIG. 2A. Downconverter 30 is a single sideband frequency converter.

Figure 4:
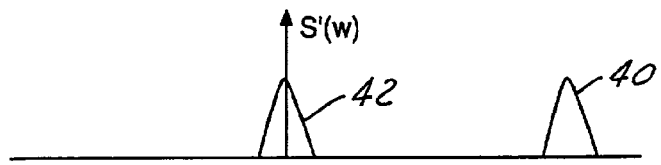
FIG. 4 is a plot of a conventionally received downconverted communication signal, in the frequency domain.

Now referring also to FIG. 4, the downconverter 30 frequency shifts S(ω) to a baseband or lower frequency level signal [S'(ω)]. S'(ω) has a higher frequency component 40 and a lower frequency component 42. The lower frequency component 42 is at a baseband frequency and is the information signal component of S(ω). Mobile satellite payloads usually use filter 31 to remove the higher frequency component 40. The filter 31 operates as a low pass filter. The combination of frequency shifting and filtering removes the entire high frequency component from S'(ω), except a baseband information signal. The output of filter 31 is then connected to an A/D converter 32.

The A/D converter 32 performs a sampling function and an inherent filtering function in a respective sampler 46 and digital filter 48. The inherent filtering function arises from a finite aperture time that is required. Although the samplers and filters are shown in the following figures as separate conceptual blocks within the A/D converters, the A/D converters may sample and filter simultaneously within the internal circuitry of the A/D converters.

The sampler 46 transforms an analog signal, such as the received communication signal S'(ω), into a sampled signal [S''(ω)]. The replica of the low frequency component 42 appear at the intervals corresponding to the sampling frequency ($f_s$). In order to avoid overlapping of the replica of the low frequency component 42 $f_s$ should be at least twice the bandwidth of the low frequency component 42. Therefore, A/D converter 32 quantize and digitize S'(ω) at a frequency equal to twice the bandwidth of the originally received communication signal [S(ω)], in order to create a resulting signal representing all information in the received communication signal. The sampling rate is referred to as the Nyquist rate to one in the art.

As a part of the sampling function, the downconverted received signal S'(t), in the time domain, is multiplied by an infinite pulse train X(t) to form the sampled signal S'(t). X(t), an infinite pulse train, is equal to the convolution (★) of an impulse train and a square pulse as follows:

$$X(t) = \{III(f_s t) \star \Pi(t/\alpha)\}$$

where $III(f_s t)$ is an infinite impulse train with repetition every $1/f_s$ seconds. $\Pi(t/\alpha)$ is a square pulse with pulse width equal to α seconds. The value of α is equal to the aperture time of the A/D converter 29. Mathematically, the time domain representation of the sampled signal S'(t) is as follows:

$$S'(t) = S'(t) * \{III(f_s t) \star \Pi(t/\alpha)\}$$

The frequency domain representation of S'(t), the spectrum signal S'(ω), is as follows:

$$S'(\omega) = S_1'(\omega) \star \{III(\omega/\omega s) * \sin(\alpha*\omega)/\alpha*\omega\}$$

where $\omega=2*\pi*f$ and $\omega_s=2*\pi*f_s$.

$S_1'(\omega)$ is the low-passed spectrum of $S'(\omega)$ and is represented by low frequency component 42. The first two terms, $S_1'(\omega)\bigstar III(\omega/\omega s)$, represent the replica of $S'(\omega)$ spaced apart by $f_s$. The third term, $\sin(\alpha*\omega)/\alpha*\omega$, is a decay function 50 caused by the finite time associated with the aperture time ($\alpha$).

Figure 5:
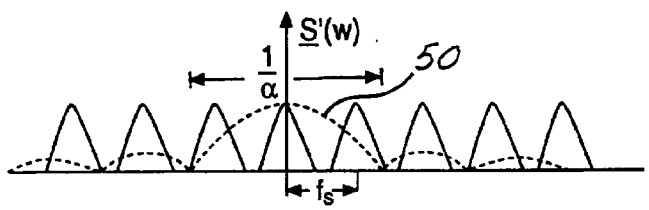
FIG. 5 is a plot of an overlay of a conventional first decay function over an ideal spectrum signal, in the frequency domain.

Now referring to FIG. 5, an overlay of a first decay function 50 on the ideal spectrum signal $\underline{S}'(\omega)$ is shown. Due to aperture time of a typical A/D converter 32, a weighted amplitude version of $\underline{S}'(\omega)$ is created. After A/D conversion $S'(\omega)$ becomes a resultant signal $[\underline{S}''(\omega)]$ via the internal filtering 48 of the A/D converter 32.

Figure 6:
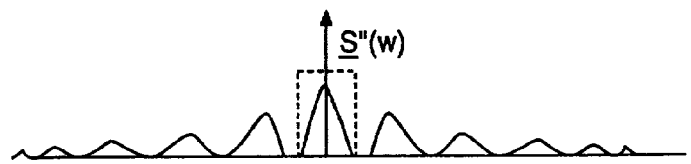
FIG. 6 is a plot of a conventional resultant sampled communication signal, in the frequency domain.

Now referring to FIG. 6, $\underline{S}'(\omega)$ after A/D conversion and filtering $[\underline{S}''(\omega)]$ is shown. The digital filter 48 removes undesired frequency components.

Now referring again to FIG. 2, the plurality of A/D converters 29, of the mobile satellite payload 18, are connected to a digital beam former 52. The plurality of A/D converters 29 form beams toward the specified user's directions by coherently adding all digital signals $[\underline{S}''(\omega)]$ received from various A/D converters 29 weighted by directional vectors. The DBF 52 forms separate beams with different directional vectors to accommodate various signals arriving from different directions.

Beam channelizers 54 transform the digital signals including amplitude and phase information into digital data streams. The beam channelizers 54 provide the digital stream over to data packet switch elements 56. The data packet switch elements 56 packetize the data streams and the packets are transmitted accordingly over crosslink antennas 58. The crosslink antennas 58 transmit signals to and receive signals from other mobile satellite payloads. The data packet switch elements 56 also provide a data stream representing one individual antenna beam to each beam synthesizer module 60. Beam synthesizer modules 60 convert the data streams to digital output signals that represent the analog waveforms that are transmitted. The beam synthesizer 60 couples the digital output signals to the DBF 52. The DBF 52 determines proper signal weights for each receive radiating element 24 and transmit radiating element 62. The DBF 52 analyzes incoming signals using a suitable algorithm and determines proper signal weights. The weighted analog transmitting signals are converted to a digital signal by a digital-to-analog (D/A) converter 64. The D/A converter 64 transforms the digital output signals for each receive radiating element 24 into corresponding analog signals for each transmit radiating element 62. The D/A converter 64 transfers the analog signals to a plurality of transmitter modules 66. The transmitter modules 66 have two components, an upconverter 68, and an amplifier 70. The analog signals are converted, via the upconverter 68 and the amplifier 70, into suitable signals for transmission to the earth station terminals 16.

The present invention eliminates the use of the separate downconverter 30 and filter 31 for the mobile satellite payload 18. The traditional A/D converter 32 is replaced with an A/D converter of the present invention 29. The A/D converter 29, by maintaining its aperture time accuracy and properly predetermining its sampling rate is capable of directly converting analog signals at carrier frequency to digital baseband level signals.

The faster the A/D converter 29 the shorter the aperture time ($\alpha$). However the reverse shall not be true. Although $\alpha$ is shortened to allow energy to be charged during a small fraction of the carrier frequency cycle, the sampling rate is still determined by the Nyquist rate to avoid spectrum overlapping. The relationship between $\alpha$ and $f_s$ is:

$$1/(A*f_s)$$

where A is a constant and depends on the particular A/D converter.

Figure 7:
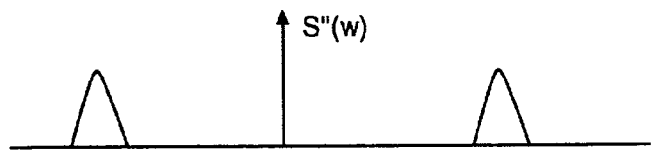
FIG. 7 is a plot of a received communication signal, in the frequency domain, in accordance with the present invention.

Now referring to FIG. 7, a received signal $[S''(\omega)]$, in the frequency domain is shown. $S''(\omega)$ in FIG. 7 is the same as $S(\omega)$ in FIG. 3. The received signal $[S''(\omega)]$ is then directly sampled by sampler 71 to form a spectrum signal $\underline{S}'''(\omega)$. However, the aperture time is so small that the decay function 72, related to $\alpha$, is small at baseband. The sampling frequency is chosen so that the replica of the positive and negative frequency components coincide precisely. As a result of this careful selection, the sample spectrum will have a baseband spectrum component, separable via digital filtering.

Figure 8:
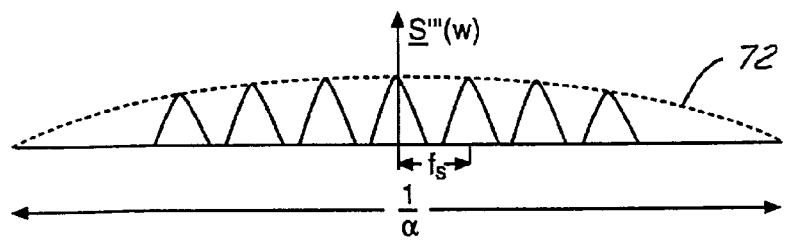
FIG. 8 is a plot of an overlay of a second decay function over an ideal spectrum signal, in the frequency domain, in accordance with the present invention.

Now referring to FIG. 8, an overlay of a second decay function 72 on the ideal spectrum signal $\underline{S}'''(\omega)$ is shown. The increased sharpness of the A/D converter 29 is characterized by the value $\alpha$. The first decay function 50 is characterized by a long $\alpha$ while the second decay function 72 is by a short one. The value of $\alpha$ for L-band and S-band signals is as short as 10 pico seconds. $\underline{S}'''(\omega)$ is also filtered within the A/D converter 29 by filter 73 to form $\underline{S}''(\omega)$.

Figure 9:
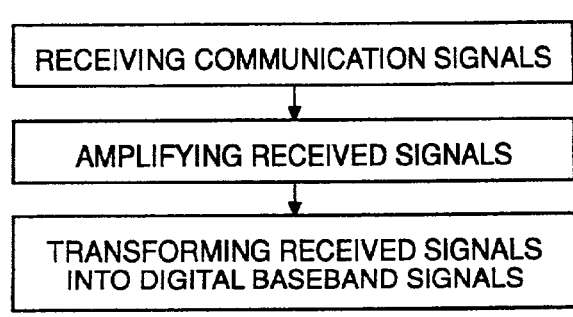
FIG. 9 is a flow chart illustrating a method, of sampling a communication signal in accordance with the present invention.

Now referring to FIG. 9, a logic flow diagram illustrating one example of a method for sampling a communication signal is shown.

In step 100, as described above, the received communication signals 26 are received by the plurality of receive radiating elements 24 and converted to received signals $[S''(\omega)]$.

In step 102, the received signals $[S''(\omega)]$ are amplified by the LNAs 28.

In step 104, the received signals $[S''(\omega)]$ are digitized through the A/D converters 29. The A/D converters 29 directly sample the received signals $[S''(\omega)]$ and then quantize and convert the sampled signals $\underline{S}'''(\omega)$ into digital formats.

The aperture time of the present invention is a fraction of the period of $f_c$ and $f_s$ is at least twice the signal bandwidth of $\underline{S}''(\omega)$, where $f_c$ is the carrier frequency and $f_s$ is the sampling frequency. Therefore, from the above mentioned, direct sampling of communication signals having a $f_c$ up to 5 GHz, without a separate downconverter, while maintaining sampling rates at approximately 100M samples per sec is possible.

The above-described invention, by eliminating the downconverter reduces the number of mobile satellite payload components. The reduction of the number of mobile satellite payload components may reduce weight, costs, and hardware of the mobile satellite payload. The present invention also provides a method for digitizing signals at frequency bands up to C-band without using a separate downconverter.

The above-described sampling method, to one skilled in the art, is capable of being adapted for various purposes and is not limited to the following applications: a ground based mobile terminal, base stations, or any other terrestrial electronic or communication devices that receive or transmit signals. The above-described invention may also be varied without deviating from the true scope of the invention.

What is claimed is:

1. A method of sampling communication signals within a mobile satellite payload having a phase array antenna, receive radiating elements, a plurality of low noise amplifiers (LNAs) and a plurality of analog-to-digital (A/D) converters, comprising:

receiving the communication signals with the receive radiating elements and forming received signals;

amplifying said received signals within the plurality of LNAs to form amplified received signals; and downconverting said amplified received signals into digital baseband signals within the plurality of A/D converters by sampling the amplified received signals at a predetermined sampling frequency fs using A/D converters with an aperture time of 1/(A*fs), where A is a constant related to the A/D converters.

2. A method as in claim 1 further comprising filtering the amplified received signals within the plurality of A/D converters.

3. A method as in claim 1 further comprising sampling the amplified received signals at properly predetermined sampling rates.

4. A method as in claim 1 further comprising maintaining the accuracy of said plurality of A/D converters aperture times (α).

5. A method as in claim 1 further comprising sampling the received signals at frequencies selected from the following group: super high frequency band (SHF), L-band, S-band, and C-band and frequency bands above C band.

6. A method as in claim 1 further comprising automatically filtering said received signals within the plurality of A/D converters.

7. A mobile satellite payload comprising:

a phase array antenna, wherein said phase array antenna comprises a plurality of receive radiating elements for forming received signals;

a plurality of low noise amplifiers (LNAs) electrically coupled to said receive radiating elements for amplifying the received signals to form amplified received signals; and a plurality of analog-to-digital (A/D) converters electrically coupled to said LNAs, wherein said plurality of A/D converters downconverting said amplified received signals into digital baseband signals by sampling the amplified received signals at a predetermined sampling frequency fs using A/D converters with an aperture time of 1/(A*fs), where A is a constant related to the A/D converters.

8. A system as in claim 7 wherein said plurality of A/D converters incorporate the function of a filter.

9. A system as in claim 7 wherein said plurality of A/D converters operates with various aperture times.

10. A system as in claim 7 wherein said plurality of A/D converters are able to perform as low pass or band pass filters.

11. A system as in claim 7 wherein said plurality of A/D converters are able to sample at different predetermined sampling rates.

12. A communication system comprising:

an antenna for receiving a received signal;

a low noise amplifier (LNA) electrically coupled to said antenna for amplifying the received signal to form an amplified received signal; and an analog-to-digital (A/D) converter electrically coupled to said LNA, wherein said A/D converter downconverts the amplified received signal into a digital baseband signal by sampling the amplified received signals at a predetermined sampling frequency fs using a A/D converter with an aperture time of 1/(A*fs), where A is a constant related to the A/D converter.

13. A method of sampling communication signals within a mobile satellite payload having a phase array antenna, receive radiating elements, a plurality of low noise amplifiers (LNAs) and a plurality of analog-to-digital (A/D) converters, comprising:

receiving the communication signals through the use of the receive radiating elements and forming received signals;

amplifying said received signals within the plurality of LNAs to form amplified received signals;

downconverting said amplified received signals within the plurality of A/D converters;

sampling said amplified received signals within the plurality of A/D converters at a predetermined sampling frequency fs using A/D converters with an aperture time of 1/(A*fs), where A is a constant related to the A/D converters;

filtering said amplified received signals within the plurality of A/D converters;

wherein the combination of downconverting, sampling, and filtering said received signals transforms said amplified received signals into digital baseband signals.

14. A method as in claim 13 wherein sampling said amplified received signals comprises maintaining the accuracy of said plurality of A/D converters aperture times (α).

15. A method as in claim 13 wherein sampling said amplified received signals comprises sampling the amplified received signals at properly predetermined sampling rates.

* * * * *